United States Patent [19]
Wetzel et al.

[11] Patent Number: 5,804,732
[45] Date of Patent: Sep. 8, 1998

[54] VIBRATOR-DRIVEN TABLE APPARATUS

[75] Inventors: Joseph D. Wetzel, Hudsonville; Mark W. Briggs, Holland, both of Mich.

[73] Assignee: Venturedyne, Ltd., Milwaukee, Wis.

[21] Appl. No.: 784,938

[22] Filed: Jan. 16, 1997

Related U.S. Application Data

[63] Continuation-in-part of Ser. No. 576,122, Dec. 21, 1995, abandoned.

[51] Int. Cl.$^6$ .................................................... B06B 3/00
[52] U.S. Cl. ............................................................ 73/663
[58] Field of Search ............................... 73/571, 663, 662, 73/667, 668, 665, 666

[56] References Cited

U.S. PATENT DOCUMENTS

| | | | |
|---|---|---|---|
| 2,438,756 | 3/1948 | Larsen | 74/26 |
| 2,706,400 | 1/1955 | Unholtz | 73/67 |
| 2,773,482 | 12/1956 | Dickie | 121/20 |
| 3,163,786 | 12/1964 | Dickinson | 310/27 |
| 3,217,531 | 11/1965 | Melton | 73/71.6 |
| 3,369,393 | 2/1968 | Farmer | 73/71.6 |
| 3,686,927 | 8/1972 | Scharton | 73/71.6 |
| 3,691,822 | 9/1972 | Deckard | 73/71.6 |
| 3,710,082 | 1/1973 | Sloane et al. | 235/151 |
| 3,748,896 | 7/1973 | Barrows | 73/71.5 |
| 3,836,098 | 9/1974 | Miyashita | 244/17.27 |
| 3,913,389 | 10/1975 | Larson | 73/71.6 |
| 3,945,246 | 3/1976 | Wadensten | 73/71.6 |
| 4,011,749 | 3/1977 | Cappel | 73/71.6 |
| 4,106,586 | 8/1978 | Stafford | 181/121 |
| 4,164,151 | 8/1979 | Nolan et al. | 76/663 |
| 4,181,025 | 1/1980 | Abstein, Jr. et al. | 73/665 |
| 4,181,026 | 1/1980 | Abstein, Jr. et al. | 76/665 |
| 4,181,027 | 1/1980 | Talbott, Jr. | 73/665 |
| 4,181,028 | 1/1980 | Talbott, Jr. | 73/665 |
| 4,181,029 | 1/1980 | Talbott, Jr. | 73/665 |
| 4,403,511 | 9/1983 | Shibano et al. | 73/665 |
| 4,440,026 | 4/1984 | Kimball | 73/663 |
| 4,446,742 | 5/1984 | Thompson, Jr. et al. | 73/663 |
| 4,537,077 | 8/1985 | Clark et al. | 73/665 |
| 4,633,716 | 1/1987 | Martin | 73/663 |
| 4,735,089 | 4/1988 | Baker et al. | 73/663 |
| 4,925,198 | 5/1990 | Ito et al. | 280/89 |
| 5,154,567 | 10/1992 | Baker et al. | 73/665 |
| 5,365,788 | 11/1994 | Hobbs | 73/665 |
| 5,412,991 | 5/1995 | Hobbs | 73/663 |
| 5,517,857 | 5/1996 | Hobbs | 73/571 |
| 5,589,637 | 12/1996 | Hobbs | 73/663 |
| 5,594,177 | 1/1997 | Hanse | 73/663 |
| 5,641,910 | 6/1997 | Middleton | 73/668 |

FOREIGN PATENT DOCUMENTS

| | | |
|---|---|---|
| 74 28856 | 3/1975 | France . |
| 63 96336 | 4/1988 | Japan . |
| 171624 | 10/1965 | U.S.S.R. . |
| 838485 | 6/1981 | U.S.S.R. . |
| 1367285 | 9/1974 | United Kingdom . |
| 2063379 | 6/1981 | United Kingdom . |
| 2211268 | 6/1989 | United Kingdom . |

OTHER PUBLICATIONS

Journal of Environmental Sciences Article Titled Alternate Methods for Cost–Effective Reliability Testing in Nov./Dec. 1976 issue.

Shock and Vibration Bulletin; 46 pp. 1–14—Acoustic and Vibration Testing—Stimulation Tactical Missile Flight Vibration with Pneumatic Vibrators.

*Primary Examiner*—Hezron E. Williams
*Assistant Examiner*—Richard A. Moller
*Attorney, Agent, or Firm*—Jansson, Shupe, Bridge & Munger, Ltd.

[57] ABSTRACT

A vibrator table apparatus includes a primary table member driven by at least two vibrators. The vibrator long axes are spaced from and angular to one another. The table member has a number of cylindrical holes formed through it. That is, the holes and "through-holes" and extend between the upper and lower surfaces of the table member. The total of the areas of the holes is in the range of 40% to 60% of the area defined by the perimeter edge of the table member and, most preferably, is about 50% of such area. The upper surface of the table member has a number of sockets formed in it for receiving respective standoff studs. A product support platform is coupled to the standoff studs and is in a spaced relationship to the upper surface.

10 Claims, 13 Drawing Sheets

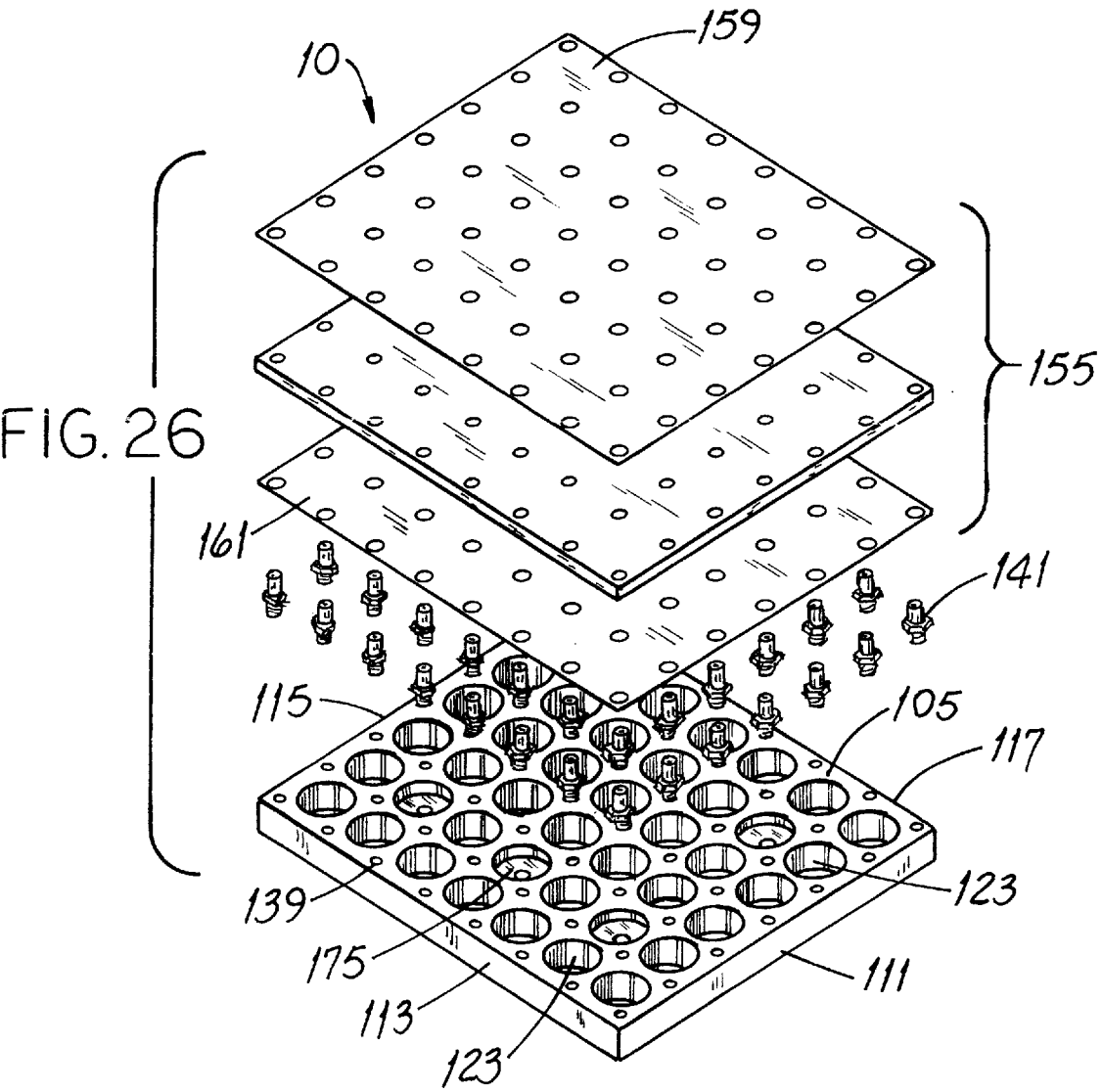
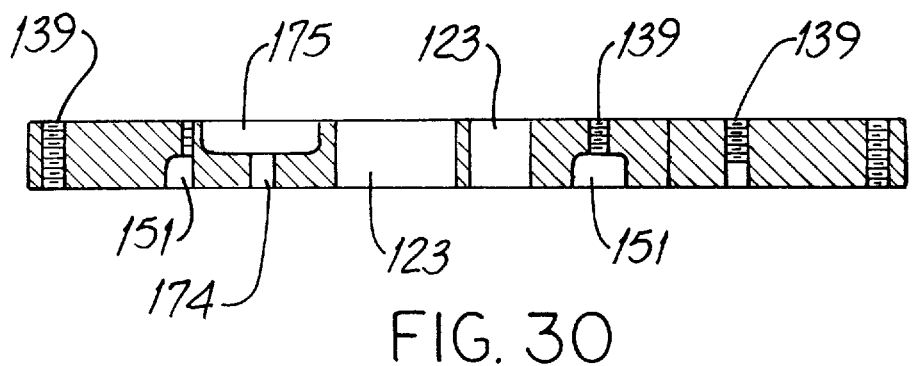

VIBRATOR-DRIVEN TABLE APPARATUS

RELATED APPLICATION

This application is a continuation-in-part of application Ser. No. 08/576,122 filed on Dec. 21, 1995, and now abandoned.

FIELD OF THE INVENTION

This invention relates generally to measuring and testing and, more particularly, to vibration testing and tables used therefor.

BACKGROUND OF THE INVENTION

Few products are sold by their manufacturer without some type of testing being conducted. Such testing may be as simple as manually ascertaining whether certain parts are securely affixed—or as complex as "stress testing." In stress testing (or "stress screening" as it is sometimes called), products exhibiting "infant mortality" fail outright during the test. Or as the result of such testing, a product may evidence the likelihood of early failure in the operating environment.

Stress testing is most frequently employed with respect to products used in demanding applications and for which exceptionally-high reliability is required. Examples include products used on ground-travelling military equipment and products (e.g., electronic and electromechanical products) used in aircraft of essentially all types.

Stress testing may be carried out in any of several different ways. One type of test regimen involves imposing rapid, extreme changes in temperature upon the product. As an example, a test chamber may be used to change the temperature of a product between −40° F. and 180° F. over a period of, say, 30 minutes. Another type of test regimen involves using a test chamber to repetitively and dramatically change the relative humidity of air around a product. And humidity-based testing may also be accompanied by temperature-based testing and vice versa.

Yet another type of stress testing involves testing a product by subjecting it to vibrations of the type which might be encountered in actual product use. For example, U.S. Pat. No. 2,438,756 (Larsen) explains that the apparatus described therein is used to vibration-test electrical apparatus for airplanes, ships and the like. The unit described in U.S. Pat. No. 3,748,896 (Barrows) is said to be used for testing parts of a motor vehicle. And vibration testing is often conducted in conjunction with testing using another regimen, e.g., temperature.

Vibration testing is carried out by mounting the product to be tested upon some sort of platform or table and then vibrating the table using a rotating eccentric or a linear vibrator. Examples of devices used to create vibratory motion are shown in the Barrows patent and in U.S. Pat. Nos. 4,106,586 (Stafford) and 5,154,567 (Baker, deceased et al.).

In general, tables used to stress test products by application of vibration to such products are of two broad types, namely, flexible and rigid. An example of the former is disclosed in U.S. Pat. No. 4,735,089 (Baker et al.) and has a flexure member, i.e., a honeycomb structure, between two plates. An example of the latter is disclosed in FIGS. 12–14 of U.S. Pat. No. 5,412,991 (Hobbs) and has a rigid core plate between upper and lower plates.

While the prior art vibrator tables have been generally satisfactory for their intended purposes, they are not without disadvantages. One relates to perceived manufactured cost. The flexible table described in the Baker et al. patent is made using a plurality of undulated sheets bonded together to form a honeycomb structure. Seemingly, making such a structure is labor intensive and may involve intermediate materials (undulated sheets) not readily available.

One rigid table disclosed in the Hobbs patent has a slab into which cores are drilled to a depth less than the slab thickness. The drawing suggests that such cores are drilled over only a part of the slab surface.

Another table disclosed in the Hobbs patent requires a relatively-thick solid core machined to have a number of small cavities. Even using a numerically-controlled machining center, such machining is likely to be somewhat time consuming. Cost is added to the product which, in view of the invention, is unnecessary.

An improved vibrator-driven table apparatus overcoming some of the problems and shortcomings of the prior art would be a distinct advance.

OBJECTS OF THE INVENTION

It is an object of the invention to provide an improved vibrator-driven table apparatus overcoming some of the problems and shortcomings of the prior art.

Another object of the invention is to provide an improved vibrator-driven table apparatus which is easily made and assembled.

Another object of the invention is to provide an improved vibrator-driven table apparatus which uses readily-available materials.

Yet another object of the invention is to provide an improved vibrator-driven table apparatus which exhibits a requisite degree of rigidity but is yet sufficiently flexible to resist cracking.

Another object of the invention is to provide an improved vibrator-driven table apparatus which may be used for simultaneous vibration and thermal stress screening. How these and other objects are accomplished will become apparent from the following descriptions and from the drawings.

SUMMARY OF THE INVENTION

The invention involves a vibrator table apparatus of the type used to "stress test" a product mounted thereon by vibrating the product. The apparatus has a primary table member driven by at least two vibrators. Each vibrator extends along a vibrator long axis and the axes are spaced from and angular to one another.

The "slab-like" primary table member has a plurality of holes formed in it and includes an upper surface and a lower surface which are coextensive and substantially parallel to one another. The holes extend between the surfaces, thereby configuring the primary table member to resist cracking.

In a more specific aspect of the invention, the plurality of holes includes first and second groups of holes. Each hole in each of the first and second groups has a center axis and the center axes of the holes in the first group are coincident with and normal to a first reference line. Similarly, the center axes of the holes in the second group are coincident with and normal to a second reference line. The second reference line is angular to the first reference line and, most preferably, is perpendicular to such first reference line.

In yet another aspect of the invention, each of two of the holes of the first group is cylindrical and such two holes have a web portion between them. Such web portion has a minimum thickness which is less than the diameter of either of the two holes of the first group.

In still another aspect of the invention, the upper surface of the primary table member includes a plurality of sockets formed in it and a separate threaded standoff stud is received in each socket. A platform is coupled to the standoff studs and the studs maintain the platform in a spaced relationship to the upper surface.

To protect the product under stress test from heat transferring from the apparatus, there is an insulating layer interposed between the platform and the upper surface. The insulating layer includes an upper surface and a lower surface, the platform is against the upper surface and there is a support sheet against the lower surface. To put it in other words, the insulating layer is "sandwiched" between the support sheet and the platform.

And the sheet, the insulating layer and the platform are in spaced relationship to the upper surface of the primary table member. The insulating assembly (comprised of the sheet, the layer and the platform) is spaced above the table member and when a product is undergoing test, such product is mounted to the apparatus by fasteners attached to the standoff studs and is spaced above the assembly.

In yet another aspect of the new vibrator table apparatus, each hole through the primary table member has a wall defining a hole area. The table member has a perimeter edge defining an area and the total of the hole areas is in the range of 40% to 60% of the area defined by the perimeter edge. Most preferably, the total of the hole areas is about 50% of the area defined by the perimeter edge.

Further details of the invention are set forth in the following detailed description and in the drawings.

BRIEF DESCRIPTIONS OF THE DRAWINGS

FIG. 26 is an exploded view of a third configuration of the new table apparatus.

FIG. 30 is a section elevation view taken along section 30—30 of FIG. 29.

DETAILED DESCRIPTIONS OF PREFERRED EMBODIMENTS

Figure 13:
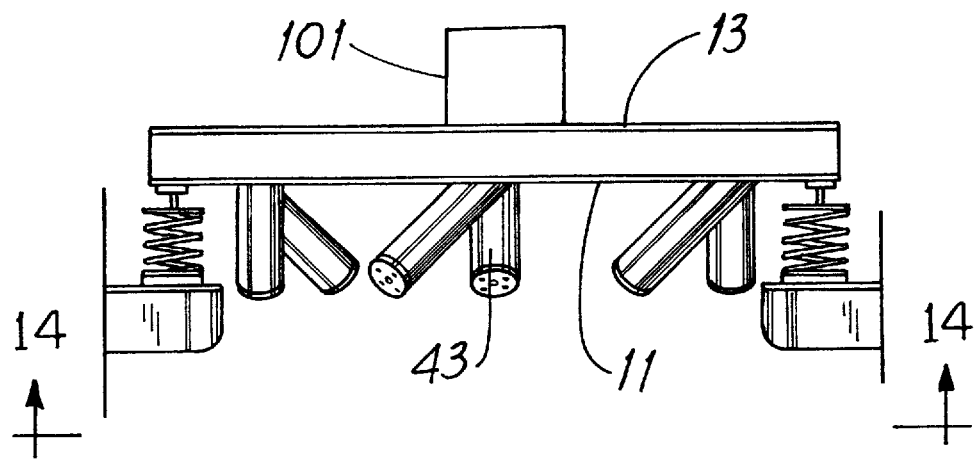
FIG. 13 is a side elevation view of the new table apparatus shown in connection with vibrators and a resilient table mounting arrangement.
Figure 14:
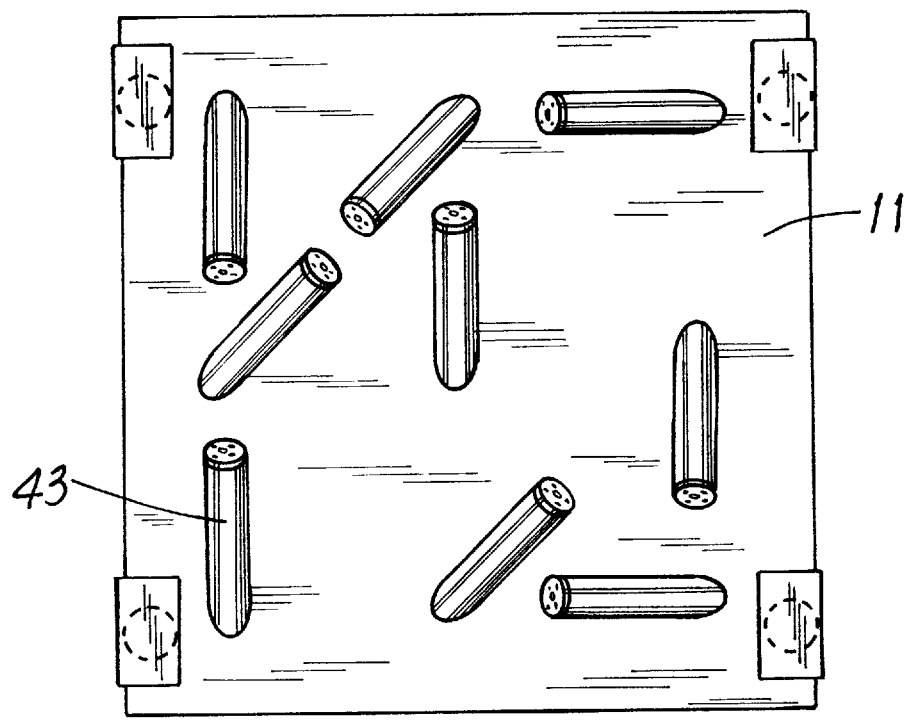
FIG. 14 is a bottom plan view of the table apparatus, vibrators and mounting arrangement of FIG. 13 taken along the viewing plane 14—14 thereof.
Figure 25:
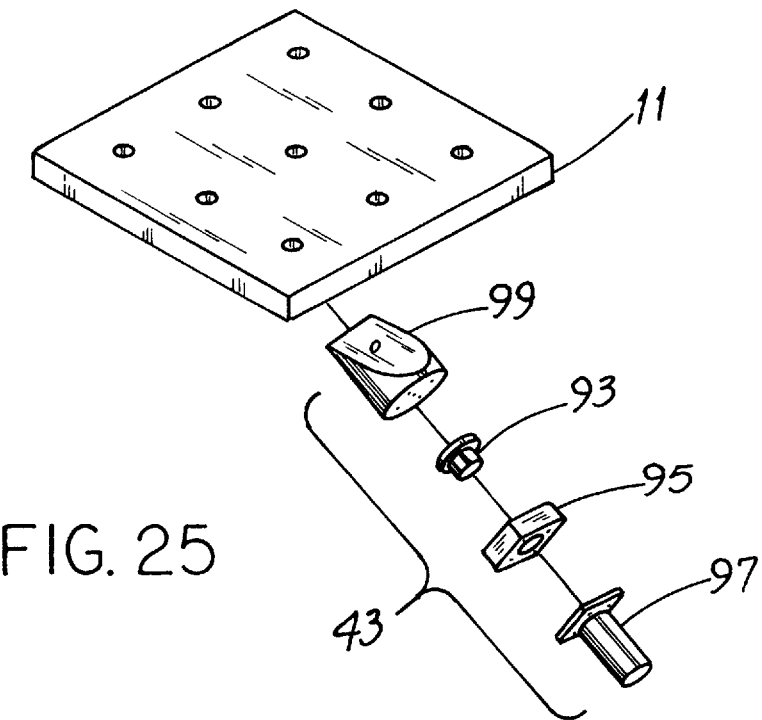
FIG. 25 is an exploded perspective view showing the impact block portion of a vibrator.

The new table apparatus 10 is disclosed in three primary configurations. The first involves FIGS. 1–12 and 18, the second involves FIGS. 15–17 and 19–24 and the third involves FIGS. 26–31. The vibrator drive arrangements of FIGS. 13, 14 and 25 are applicable to all configurations.

Referring first to FIGS. 1 through 7, the new table apparatus 10 in its cross-tube configuration will be described first. Such apparatus 10 includes first and second spaced-apart members 11 and 13, respectively. Each member 11, 13 is preferably embodied as a substantially flat plate. A vibration-transmitting structure 15 is between the members 11, 13 and propagates vibrations from that member which is driven by one or more vibrators (e.g., member 11) to that member 13 on which a product to be tested is mounted.

The structure 15 has a plurality of spaced tubes 17 interposed between the members 11, 13. More specifically, there is a first group 19 of hollow, rectangular linear tubes 17 fixed with respect to the first member 11. Such tubes 17 are generally parallel to one another and each tube 17 and the member 11 adhere to one another along substantially the entirety of the length of each tube 17 and along the entirety of the surface of the member 11.

Similarly, there is a second group 21 of hollow, rectangular linear tubes 17 fixed with respect to the second member 13. Such tubes 17 are generally parallel to one another and each tube 17 and the second member 13 adhere to one another along substantially the entirety of the length of each tube 17 and along the entirety of the surface of the member 13. Epoxy is an acceptable adhesive for attaching the tubes and members, e.g., tubes 17 and member 13, to one another.

Figure 2:
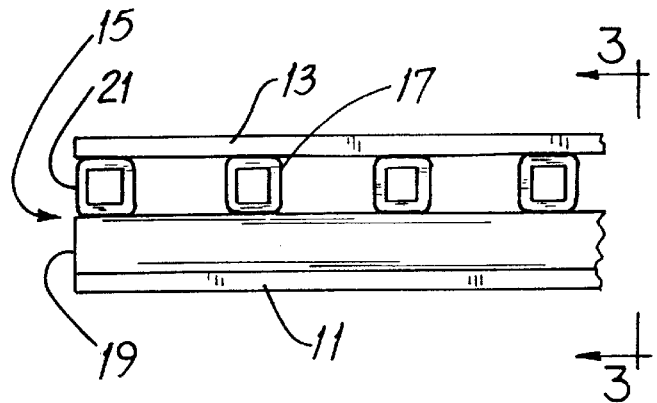
FIG. 2 is an edge view of a variation of the table apparatus of FIG. 1. Parts are broken away.
Figure 3:
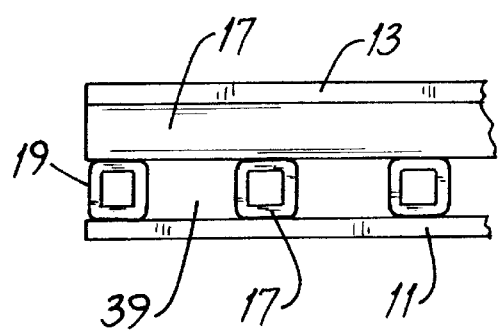
FIG. 3 is an edge view of the variation of FIG. 2 taken along the viewing plane 3—3 thereof. Parts are broken away.
Figure 8:
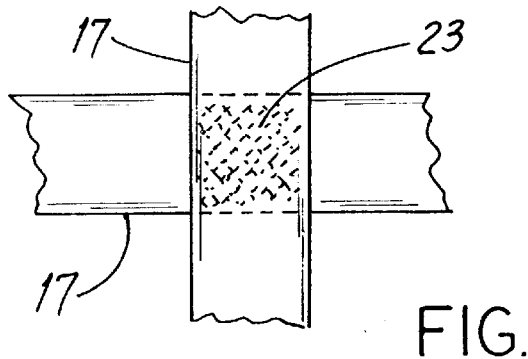
FIG. 8 is a plan view of the bonding area at intersections of tubes shown in FIGS. 2 and 3. Parts are broken away.

In the arrangement shown in FIGS. 2 and 3, the tubes 17 of the first group 19 contact and adhere directly to the tubes 17 of the second group 21. In such arrangement, areas of adhesion 23 (as shown in FIG. 8) are generally square.

Figure 1:
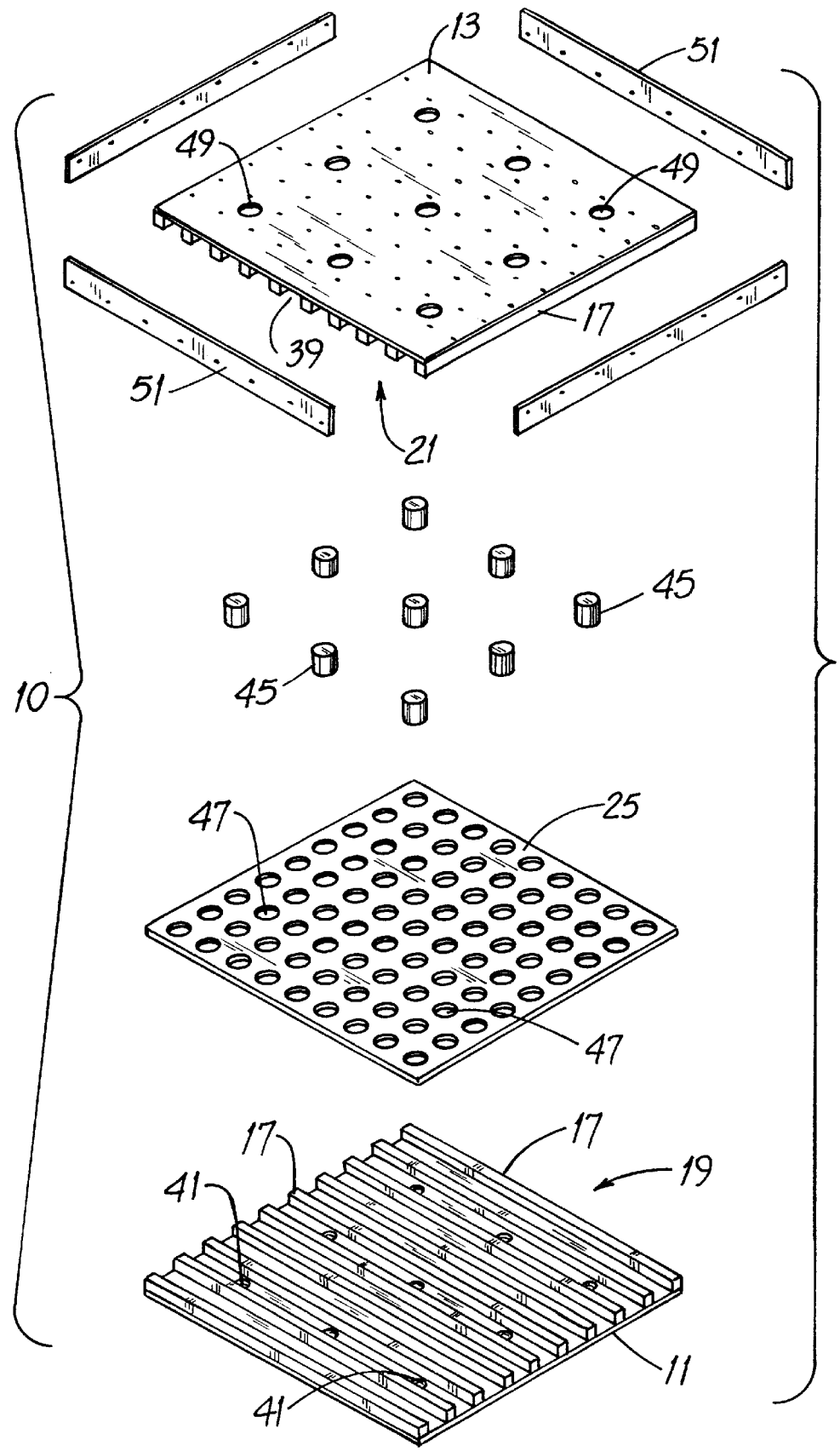
FIG. 1 is an exploded view of one configuration of the new table apparatus.
Figure 4:
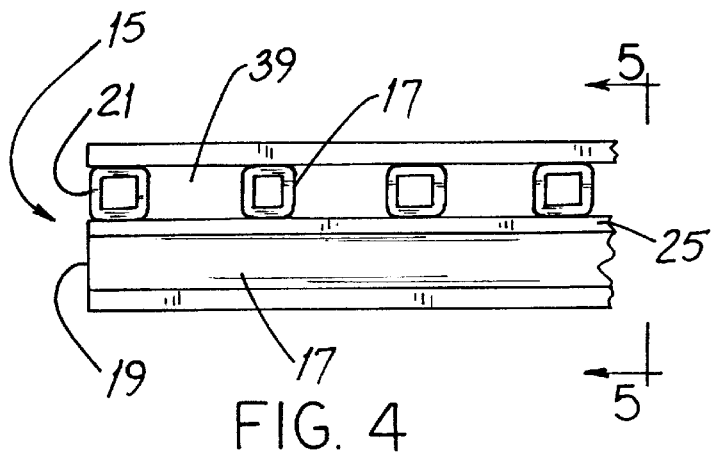
FIG. 4 is an edge view of the table apparatus of FIG. 1. Parts are broken away.
Figure 5:
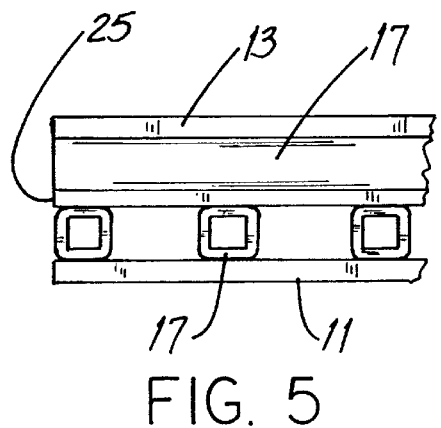
FIG. 5 is an edge view of the table apparatus of FIG. 4 taken along the viewing plane 5—5 thereof. Parts are broken away.

In another arrangement shown in FIGS. 1, 4 and 5, the apparatus 10 also has a first intermediate member 25, e.g., another plate, interposed between the first group 19 of tubes 17 and the second group 21 of tubes 17. Rather than being attached to one another, tubes 17 of the first group 19 and tubes 17 of the second group 21 are each attached to the intermediate member 25 by adhesive bonding, for example.

Figure 6:
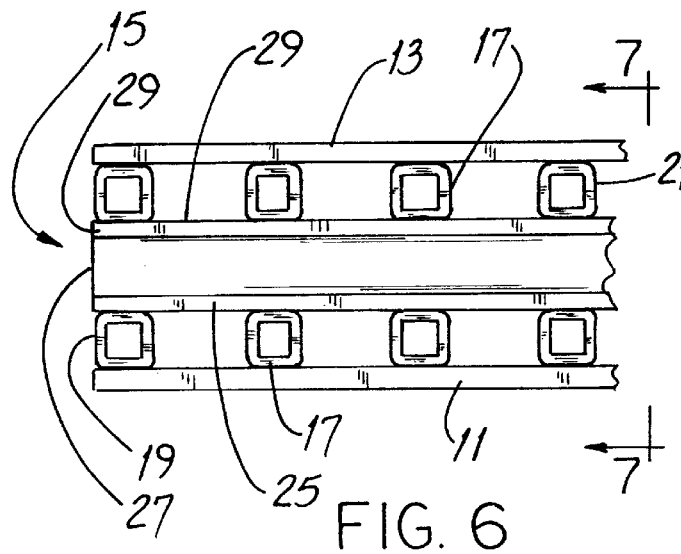
FIG. 6 is an edge view of another variation of the table apparatus of FIG. 1. Parts are broken away.
Figure 7:
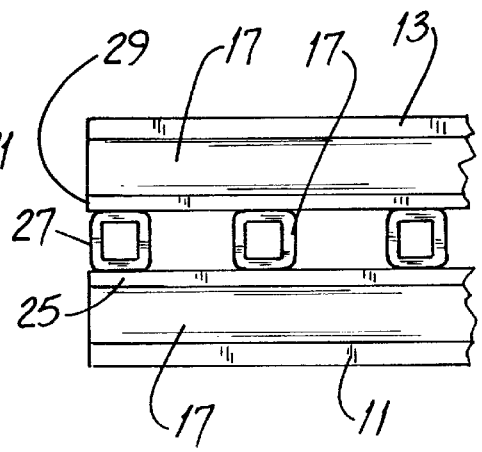
FIG. 7 is an edge view of the variation of FIG. 6 taken along the viewing plane 7—7 thereof. Parts are broken away.

But as shown in FIGS. 6 and 7, the apparatus 10 is not limited to having a single intermediate member 25. Such apparatus 10 may have a third group 27 of tubes 17 and first and second intermediate members 25, 29, respectively. Tubes 17 of the third group 27 are "sandwiched" between and attached to both intermediate members 25, 29. And further stacking of intermediate members and "layers" of tubes 17 is possible.

Figure 9:
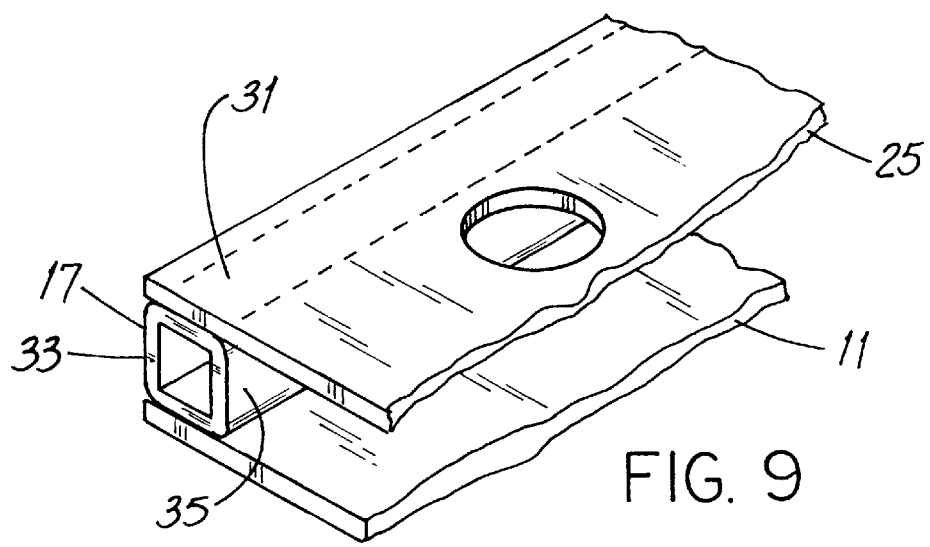
FIG. 9 is a perspective view of the elongate bonding area at the intersection of a tube and a plate-like member shown in FIGS. 4, 5, 6 and 7. Parts are broken away.
Figure 18:
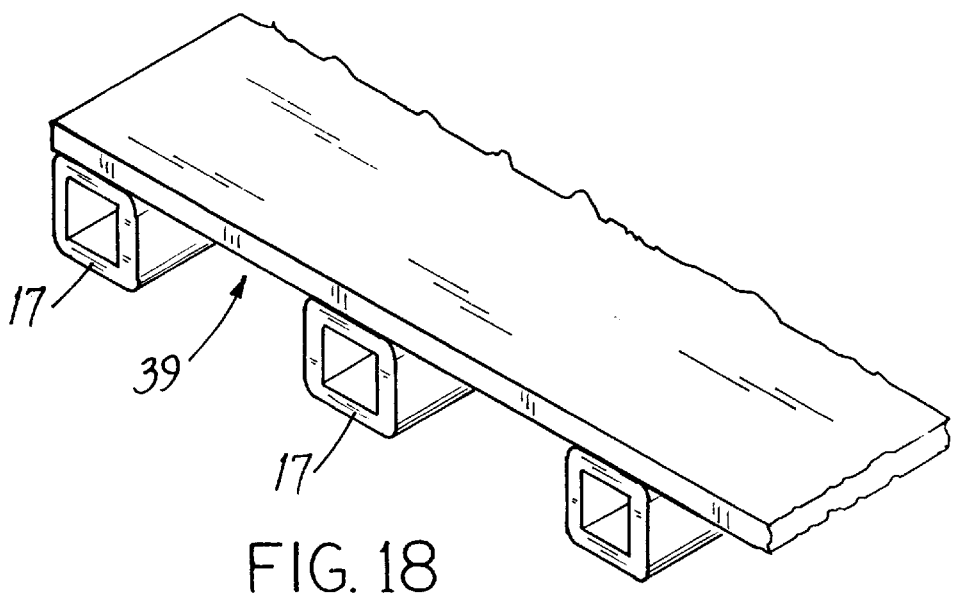
FIG. 18 is a perspective view of a portion of the table apparatus of FIG. 1. Parts are broken away.
Figure 10:
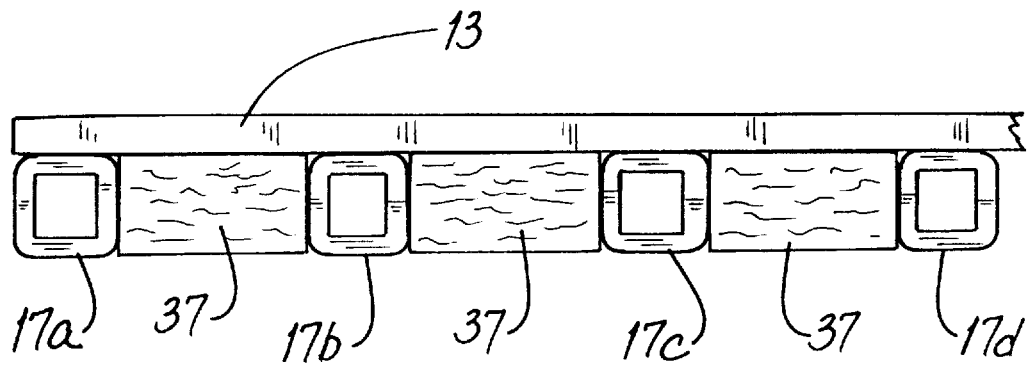
FIG. 10 is an edge view of the upper portion of the apparatus of FIG. 1 showing resilient material between tubes. Parts are broken away.
Figure 11:
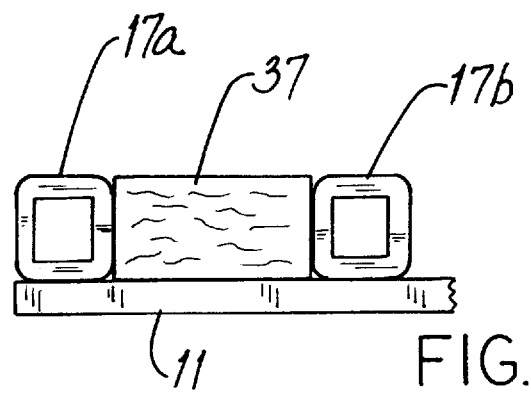
FIG. 11 is an edge view of the lower portion of the apparatus of FIG. 1 showing resilient material between tubes. Parts are broken away.
Figure 12:
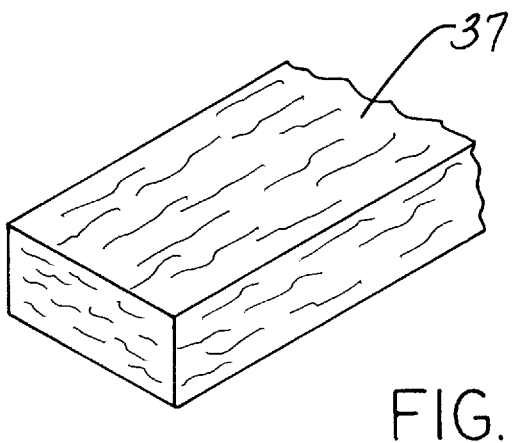
FIG. 12 is a perspective view of a block of resilient material shown in FIGS. 10 and 11. Part is broken away.

An advantage of using one or more intermediate members 25, 29 is that the area of the bonded tube surfaces away from one of the members 11, 13 is substantially increased. Specifically, each tube 17 is bonded to an intermediate member, e.g., member 25, along the entire tube length as represented by the area 31 bounded by the dashed lines in FIG. 9. Each tube 17 is also bonded to at least one intermediate member, e.g., either the first intermediate member 25 (as shown in FIGS. 1, 4, 5, 6 and 7) or to the second intermediate member 29 as shown in FIGS. 6 and 7 along the entire tube length. In FIG. 9, the strip-like area of bonding 31 is between the tube side surfaces 33, 35 and is at the junction of the tube 17 and the intermediate member 25.

As to tube orientation, the tubes 17 comprising the first group 19 are generally parallel to one another while those comprising the second group 21 are also generally parallel to one another. Each tube 17 in the first group 19 is angled with respect to each tube 17 in the second group 21 and, most preferably, tubes 17 in one group 19 and those in the other group 21 are angled at about 90° to one another.

The new apparatus 10 is rigid and constructed as shown in the FIGURES, such apparatus 10 transmits vibrations substantially undiminished. However, vibration dampening is preferred. To that end and referring particularly to FIGS. 10, 11 and 12, the plurality of tubes 17 includes first, second, third and fourth tubes 17a, 17b, 17c and 17d respectively. The apparatus 10 includes an elongate, block-like piece 37 of resilient material contacting each of such tubes 17a–17d.

Most preferably, each piece 37 of resilient material is selected to have a width and length such that a piece 37 contacts each of two adjacent tubes, e.g., tubes 17a and 17b, along substantially the entire length of each tube 17. Further, each piece 37 of resilient material is selected to have a thickness such that the piece 37 contacts the immediately-adjacent first member 11, the second member 13, one or more intermediate members 25, 29, as the case may be.

Stated another way, resilient material contacts the tubes 17, the members 11, 13 and the intermediate member(s) 25, 29 and fills substantially all of the space 39 between tubes 17, between a member 11 and a member 13 and between a member 11 or 13 and an intermediate member 25, 29. And the resilient material has a function in addition to vibration dampening. When temperature-related testing is also being performed and the second member 13 is at a temperature higher or lower than that of the first member 11, the resilient material also acts as a thermal insulator and inhibits heat transfer between the members 11, 13.

Referring again to FIG. 1 and also to FIGS. 13 and 14, the first member 11 preferably includes a plurality of holes 41, at least some of which are used to attach vibrators 43 to the first member 11 at various locations. (It is to be appreciated that FIGS. 13 and 14 are representations intended to show that a vibrator 43 can be mounted at any one or more of one or more angles and at any of several locations.)

To permit easy top access to such holes 41 for installing bolts or the like, hollow sleeves 45 are interposed between the members 11, 13 (and members 25 or 25, 29, if used) and are in registry with holes 47 and with holes 49 in the upper member 13. In a specific embodiment, the holes 49 in the upper member 13 correspond in number with those holes 41 in the lower member 11 and are in vertical registry with such holes 41 and with the sleeves 45. In the arrangement of FIG. 1 (which includes an intermediate member 25), holes 47 in such member 25 are sized and located to permit a respective sleeve 45 to pass therethrough. The apparatus 10 may also include edge trim strips 51 for improved aesthetics.

Figure 15:
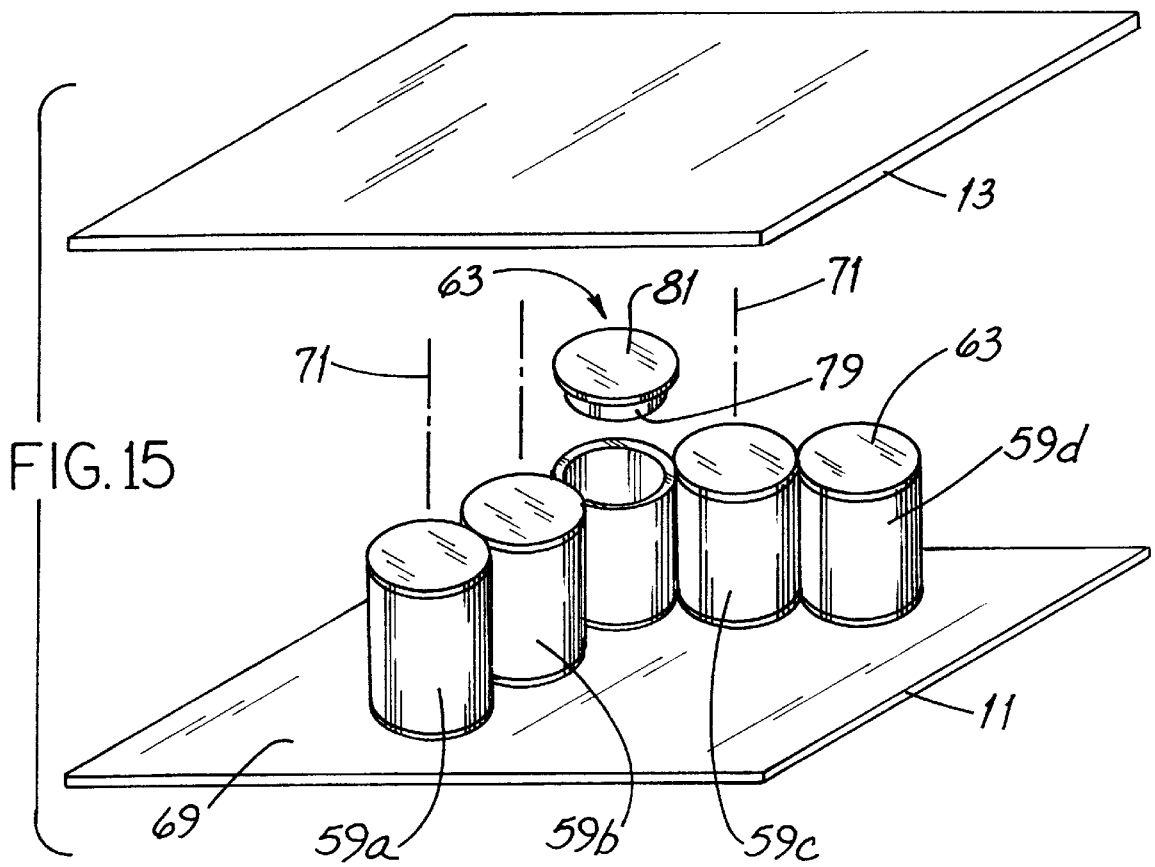
FIG. 15 is an exploded view of another configuration of the new table apparatus.
Figure 16:
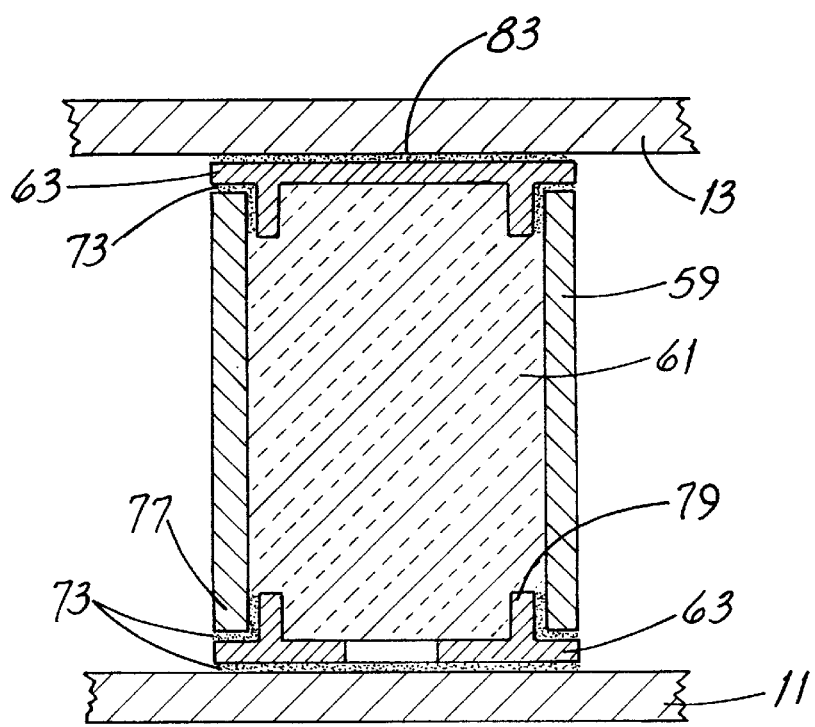
FIG. 16 is a cross-sectional side elevation view of portions of the apparatus of FIG. 15. Parts are broken away.

Another embodiment of the table apparatus 10 (sometimes referred to as the "upright tube" version) will now be described. Referring also to FIGS. 15 and 16, such apparatus 10 has a plurality of spaced tubes 59, e.g., first through fourth tubes 59a, 59b, 59c and 59d, respectively. Such tubes 59a, 59b, 59c, 59d are interposed between the members 11, 13 and the apparatus 10 includes resilient material 61 contacting each of such tubes 59. (In FIG. 17, resilient material 61 is shown to contact and fill spaces between only some of the tubes 59. This illustrates the fact that the apparatus 10 is useful with or without such material 61.) As shown in FIG. 16, resilient insulating and dampening material 61 fills each of the tubes 59, contacts each of such tubes 59 along the entire tube length and contacts tube cap portions 63 which are further described below.

Depending upon tube configuration, e.g., having a cross-sectional shape of rectangular, round or some other geometric configuration, and the way in which tubes 17 or 59 are arranged with respect to each other, such tubes 17 or 59 have or may have spaces 39 or 67 between them. Merely as an example, in the arrangement of FIGS. 1–7, 18, the tubes 17 are located to have spaces 39 between them. Similarly, the tubes 59 in FIG. 19 have spaces 67 between them. (It should be noted that there would be no spaces 39 if such rectangular tubes 17 were located contiguously and were of such a number that they occupied substantially all of the surface area of the member 11, 13.)

Figure 17:
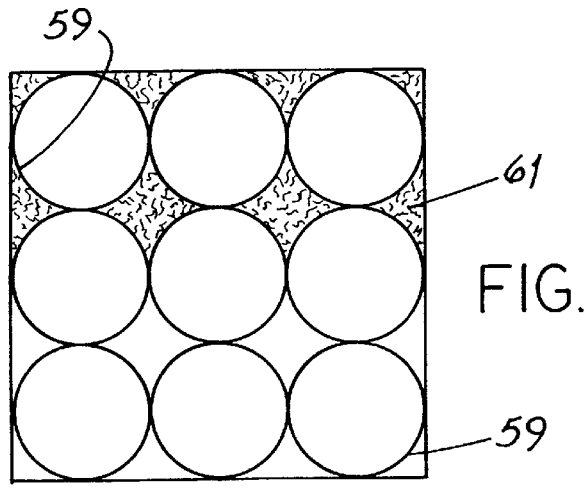
FIG. 17 is a top plan view of a portion of the apparatus of FIG. 15. Spaces between certain of the tubes are filled with resilient material.
Figure 23:
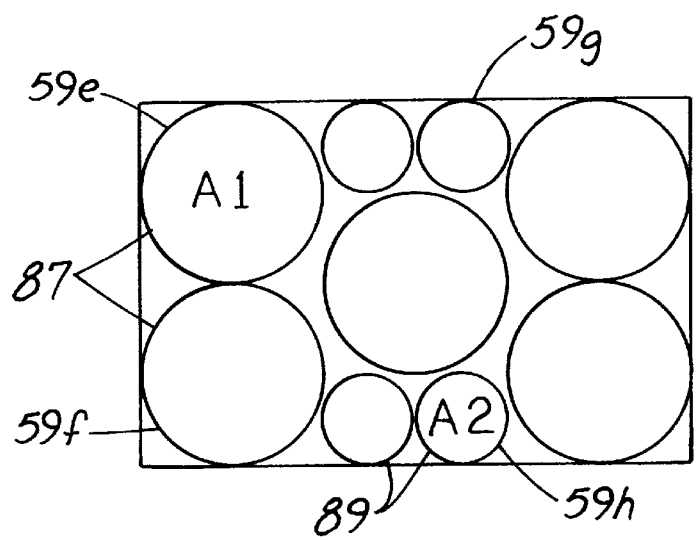
FIGS. 21, 22, 23 and 24 are top plan view of a portion of the apparatus of FIG. 15 showing yet other arrangements of tubes.
Figure 24:
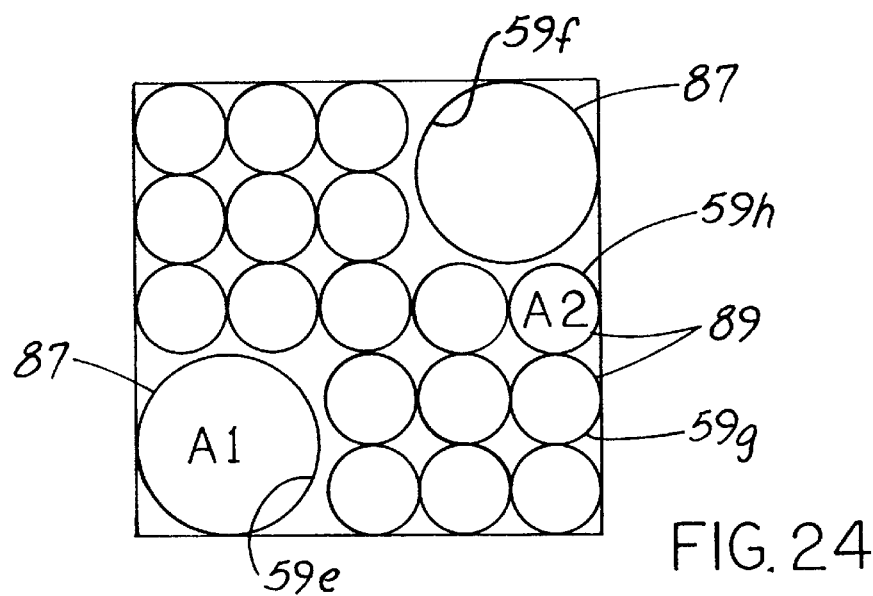
Figure 19:
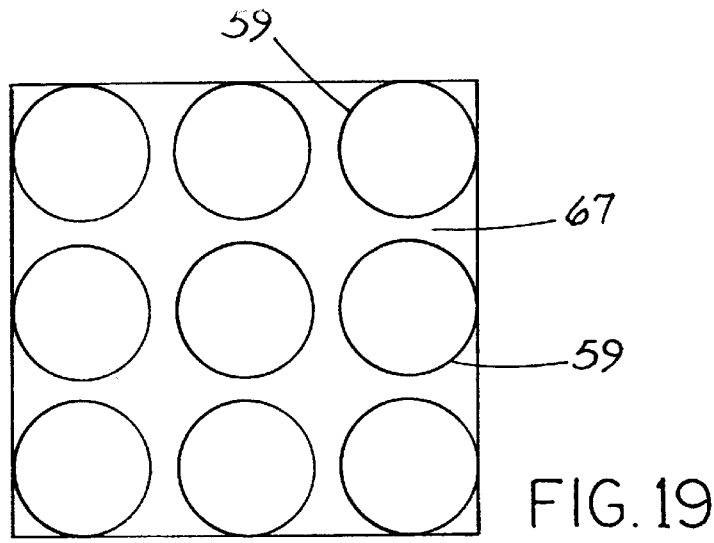
FIG. 19 is a top plan view of a portion of the apparatus of FIG. 15 showing another arrangement of tubes.
Figure 21:
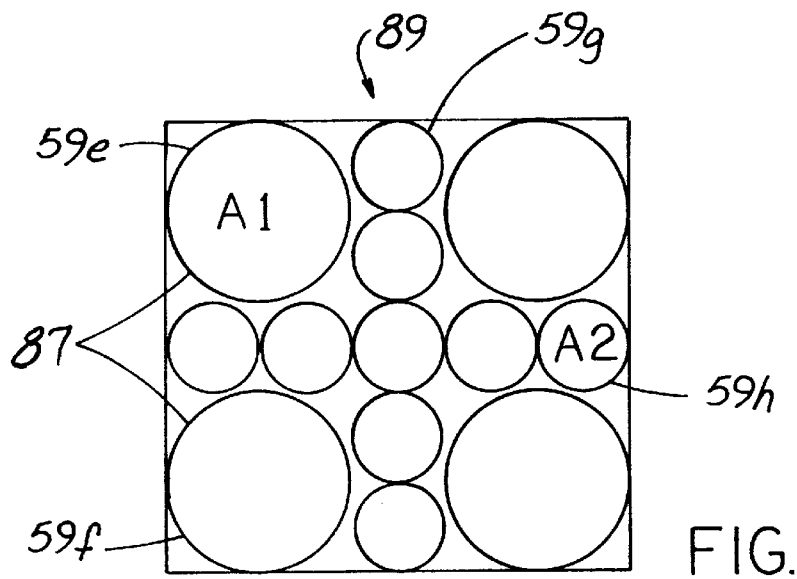
Figure 22:
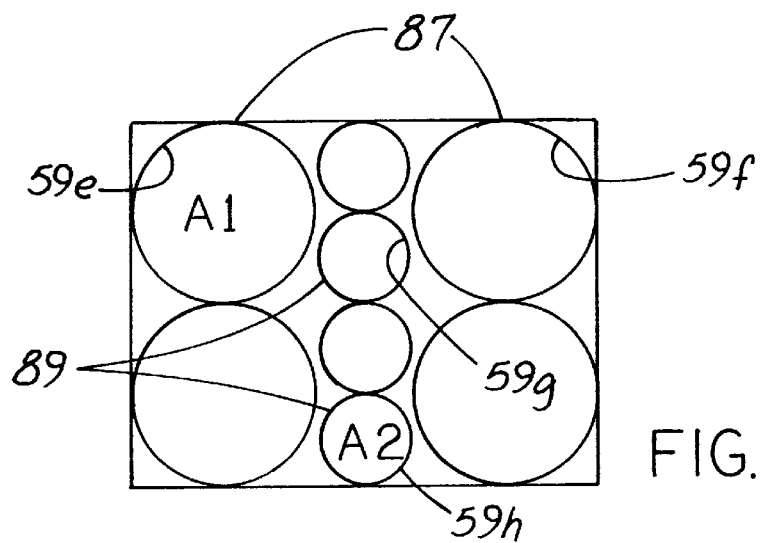

As represented in FIG. 17, the resilient material 61 also fills the spaces 67 and extends to and contacts both the first and second members 11, 13. As with the cross-tube version described above, the resilient material 61 dampens vibration and, when temperature-related testing is being performed, inhibits heat transfer between members 11, 13.

Referring particularly to FIG. 15, at least the first member 11 extends along a plane 69 and the tubes 59 are angled with respect to the plane 69, preferably at an angle of 90°. Each of the tubes 59 has a central axis 71 and, preferably, the axes 71 are generally parallel to one another and generally perpendicular to the plane 69 of the first member 11.

Figure 20:
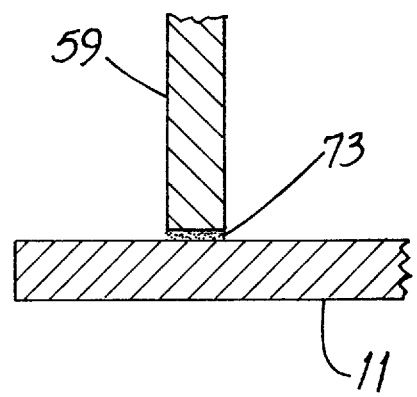
FIG. 20 is a cross-sectional side elevation view of a variation of the apparatus of FIGS. 15 and 16. Parts are broken away.
Figure 31:
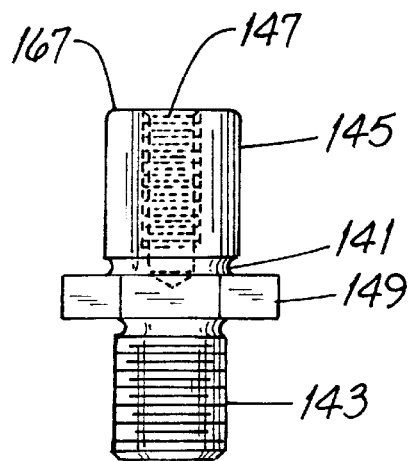
FIG. 31 is an elevation view of a standoff stud, another component of the apparatus of FIG. 26. Interior surfaces of the stud are shown in dashed outline.

The tubes 59 may be attached to each member 11, 13 in either of at least two ways. As shown in FIG. 20, attachment may be by using adhesive 73 bond the lower ends of the tubes 59 directly to the first member 11. The tube upper ends are similarly bonded directly to the second member. In a more preferred arrangement shown in FIGS. 15 and 16, at least one tube 59 has a tube end 77 adjacent to but slightly spaced from the first member 11 and the apparatus 10 includes a cap portion 63 interposed between the tube end 77 and the first member 11. The cap portion 63 has an annular rim 79 overlapping the tube end 77, either around the inside surface (as shown) or around the outside surface of such end 77.

A comparison of FIGS. 16 and 20 and makes it clear why cap portions 63 are preferred. The area covered by adhesive 73 in FIG. 16 is quite substantially greater than that covered by adhesive 73 in FIG. 20 and the rim 79 "locates" the tube end 77 in a particular position. And the attachment plate 81 of the cap portion 63 has adhesive 73 across its entire surface as at location 83.

Any of several configurations of the upright tube version is possible and gives acceptable results. In that shown in FIGS. 15, 17 and 19, the tubes 59 are generally cylindrical and have the same diameter and the same wall thickness. In another arrangement shown in FIG. 21, the plurality of tubes 59 includes first and second groups 87, 89, respectively, of tubes 59. The exemplary first group 87 includes tubes 59e and 59f, the exemplary second group 89 includes tubes 59g and 59h.

The cross-sectional area A1 of at least one tube 59e in the first group 87 is greater than the cross-sectional area A2 of at least one tube 59h in the second group 89. And the tubes 59 (whether of the same or dissimilar cross-sectional areas) may abut one another (as in FIG. 17), may be spaced from one another (as in FIG. 19) or, as in FIGS. 21–24, may be mounted with some tubes 59 in abutment and other tubes 59 spaced from one another.

In yet another configuration of either the cross-tube or the upright-tube arrangement, the first plate-like member 11 is made of a first material and the second plate-like member 13 is made of a second, different material. The apparatus 10 thereby has differing resonance frequencies. Steel, aluminum and titanium are among the exemplary materials.

Referring next to FIG. 25, because of the rigidity of the table apparatus 10, it is preferred to moderate some of the "sharpness" with which a vibrator 43 would otherwise shake the apparatus 10. To that end, each vibrator 43 is equipped with a somewhat-resilient impact block 93 made of TEFLON® or DELRIN®, for example. Such block 93 is in an opening in an adapter block 95 and is between the vibrating device 97 and the mounting bracket 99 used to couple motion of the device 97 through the block 93 to the first member 11.

Referring again to FIGS. 13 and 14, a product 101 to be tested is mounted atop the second member 13 and secured there by bolts or the like. One or more vibrators 43 are energized and shake the apparatus 10 and the product 101 for a time and in a way that is usually predetermined for a particular product 101.

It is to be appreciated that while "pieces" 37 of resilient material are mentioned above, there are other ways to provide such material. For example, a highly-viscous foaming material may be injected into spaces 39, 67 and allowed to solidify.

Figure 27:
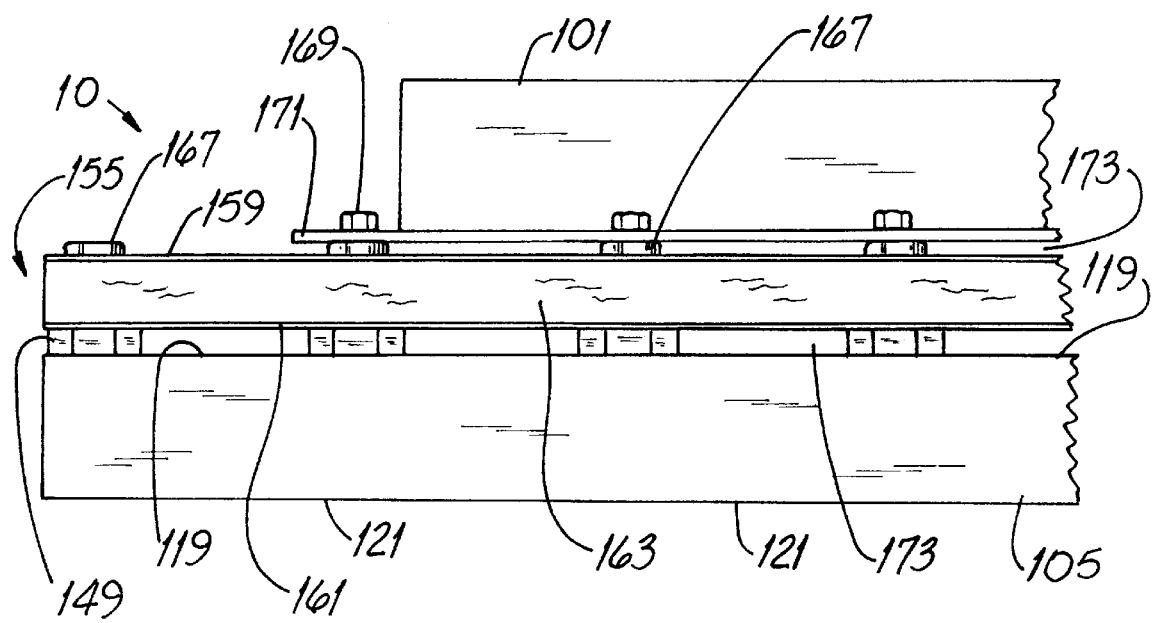
FIG. 27 is an elevation view of the table apparatus of FIG. 26 shown in conjunction with a product under test. Parts are broken away.
Figure 28:
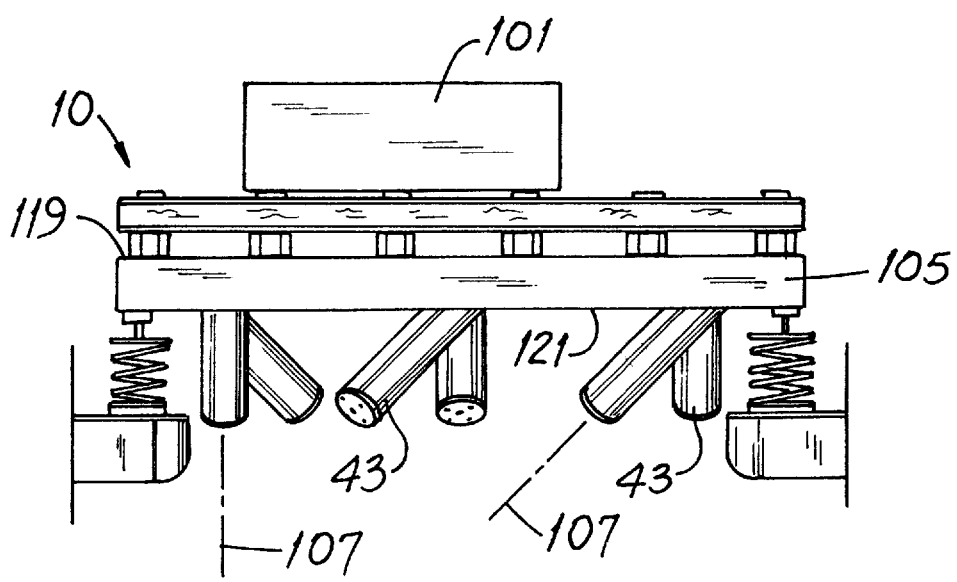
FIG. 28 is a side elevation view of the new table apparatus of FIG. 26 shown in connection with vibrators and a resilient table mounting arrangement.

A third configuration of the new apparatus 10 is shown in FIGS. 26, 27, and 28 and includes a primary table member 105 driven by at least two impactors or vibrators 43. Each vibrator 43 extends along a vibrator long axis 107 and the axes 107 are spaced from and angular to one another.

Figure 29:
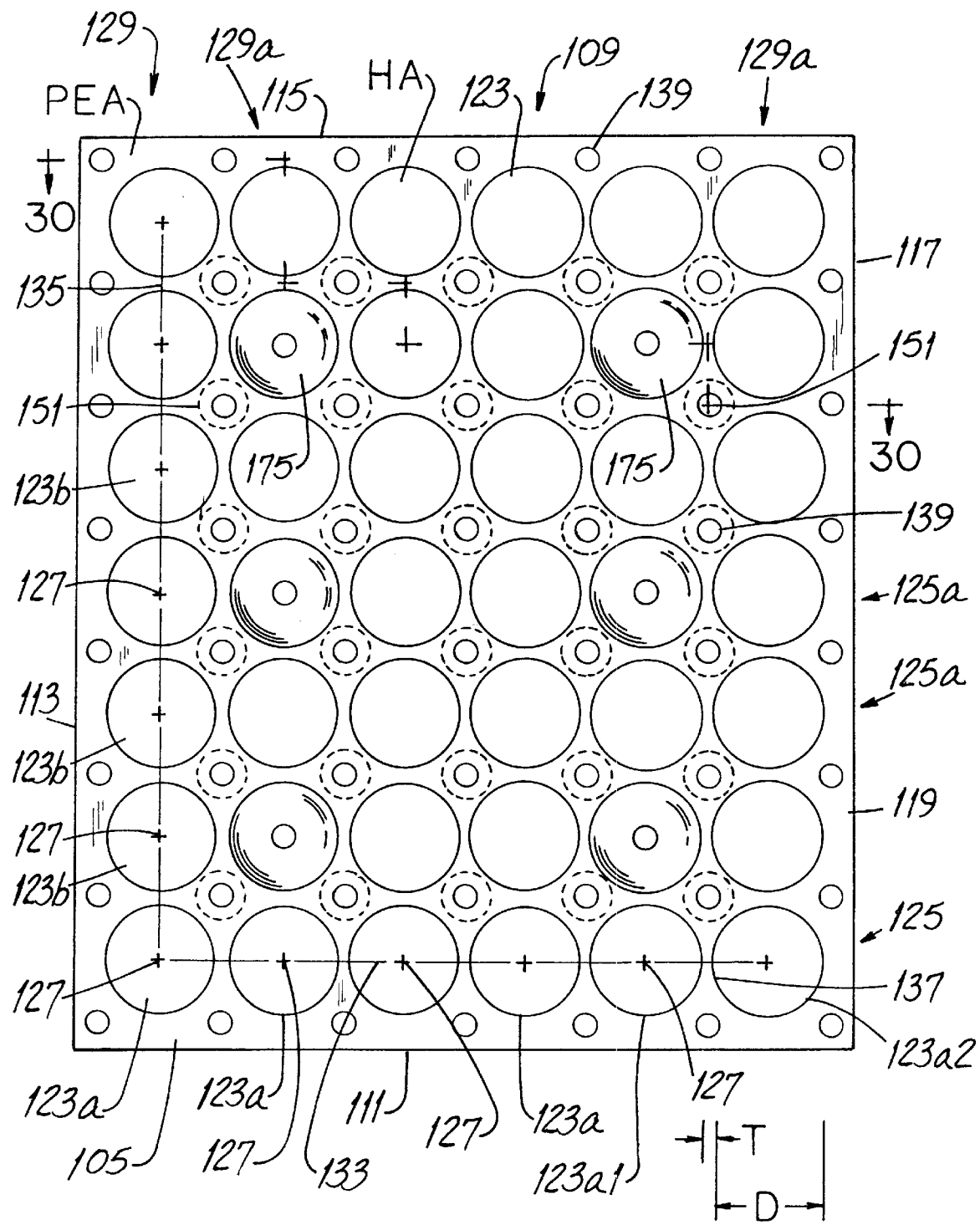
FIG. 29 is a top plan view of the table member, a component of the apparatus of FIG. 26. Surfaces of parts are shown in dashed outline.

Referring also to FIG. 29, the primary table member 105 has a perimeter edge 109 defined by the generally planar surfaces 111, 113, 115, and 117. The surfaces 111 and 115 are parallel to one another as are the surfaces 113 and 117. And the surfaces 111 and 113 are perpendicular to one another. The table member 105 also has upper and lower surfaces 119 and 121, respectively, which are coextensive, substantially parallel to one another and contiguous with the edge surfaces 111, 113, 115, 117.

The table member 105 has a plurality of unthreaded, generally cylindrical holes 123 formed in it and most preferably (at least from the standpoint of ease of manufacturing), such holes 123 are of uniform diameter. The holes 123 extend between the surfaces 119, 121 thereby configuring the table member 105 to resist cracking. That is, in a highly preferred embodiment, all of the holes 123 extend through the member 105 and none of the holes 123 are "blind," i.e., none of the holes 123 has a closed end.

The plurality of holes 123 includes a first group of holes made up of holes 123a and forming a row 125. Each of the holes 123a has a center axis 127. Such plurality also includes a second group of holes made up of holes 123b and forming a column 129. And each of the holes 123b also has a center axis 127 which is coincident with the center of a circle defined by its respective hole 123b. (It is to be appreciated that the row 125 and the column 129 are exemplary and that the table member 105 includes additional rows of holes, e.g., rows 125a, and additional columns 129a.

The center axes 127 of the holes 123a in the first group are coincident with and normal to a first reference line 133 and the center axes 127 of the holes 123b in the second group are coincident with and normal to a second reference line 135. The second reference line 135 is angular to the first reference line 133 and, most preferably, is perpendicular to such first reference line 133.

Each of two of the holes of the first group, e.g., holes 123a1 and 123a2, is cylindrical and such two holes 123a1, 123a2 have a web portion 137 between them. Such web portion 137 has a minimum thickness T which is less than the diameter D of either of the two holes 123a1, 123a2.

Referring to FIGS. 26, 27, 29, 30 and 31, the table member 105 includes a plurality of sockets 139 formed in it. Each socket 139 is drilled and tapped and a separate threaded standoff stud 141 is received in each socket 139. More specifically, each stud 141 has an externally threaded shank 143 which is received in a socket 139 and an upwardly extending neck 145 with an interiorly threaded cavity 147. A nut portion 149 is between the shank 143 and the neck 145 and when the stud 141 is installed, the nut portion 149 is "jammed" against the upper surface 119, thereby setting the height to which each neck 145 extends above the table member upper surface 119.

As shown in FIGS. 29 and 30, sockets 139 (except for those adjacent to the perimeter edge 109) are terminated by an enlarged relief region 151. Such regions 151, the formation of which involves metal removal, reduce the weight of the table member 105.

As particularly shown in FIG. 26 and 27, the new apparatus 10 has an assembly 155 comprising a thin, relatively rigid upper platform 159, a thin, relatively rigid support sheet 161 and an insulating layer 163 interposed between the platform 159 and the sheet 161. That is, the platform 159, the layer 163 and the sheet 161 are contiguous. And the platform 159, the layer 163 and the sheet 161 are parallel to one another and to the surfaces 119, 121 of the primary table member 105. Most preferably, the platform 159 and the sheet 161 are glued to the layer 163 with adhesive.

In a highly preferred embodiment shown in FIG. 27, the total thickness of the platform 159, layer 163, and sheet 161 is somewhat less than the height of the neck 145. So configured, the ends 167 of the necks 145 extend slightly above the platform 159. A product 101 undergoing test may thereby be conveniently bolted to any combination of standoff studs 141 by extending fasteners 169 through the product mount 171 and into the cavities 147 of selected studs 141.

The studs 141 thereby maintain the assembly 155 in a spaced relationship to the upper surface 119 of the table member 105 and also maintain the product 101 in a spaced relationship to the assembly 155. Both the layer 163 and the spaces 173 help protect the product 101 under stress test from heat transferring from the apparatus 10 and the sheet 161 helps prevent the layer 163 from sagging between the studs 141.

Referring particularly to FIG. 29, each hole 123 through the primary table member 105 has a hole area HA. The perimeter edge 109 (comprising surfaces 111, 113, 115 and 117) defines an area PEA and the total of the hole areas HA is in the range of 40% to 60% of the area PEA defined by the perimeter edge 109. Most preferably, the total of the hole areas HA is about 50% of the area PEA defined by the perimeter edge 109.

Referring to FIGS. 26, 28, 29 and 30, the upper ends of the vibrators 43 are attached to the table member 105 by fasteners extending downwardly through the vibrator attachment holes 174 and depressions 175 formed in the upper surface 119 of the member 105 and aligned with respective holes 174. Such depressions 175 are provided as something of a "countersink" so that the fasteners are flush with or somewhat below such surface 119.

The primary table member 105 has significant flexibility and is configured to avoid (or at least dramatically reduce) stress concentrations in the member 105. Such stress concentrations are likely to arise if, for example, the holes 123 were drilled to a depth and closed at one end. (So-called "stress risers" occur whenever there is an abrupt change in the direction or contour of a surface.) And the new table member 105 is easy to manufacture, especially with a computer-controlled machining center of the automatic toolchanging type. Such a machine is able to locate and drill the holes 105, the sockets 139 and depressions 175 while unattended.

While the principles of the invention have been shown and described in connection with but a few embodiments, it is to be understood clearly that such embodiments are by way of example and are not limiting.

What is claimed:

1. In a vibrator table apparatus including a primary table member driven by at least two vibrators and wherein:

each vibrator extends along a vibrator long axis;

the axes are spaced from and angular to one another;

the primary table member has a plurality of holes formed therein; and the member includes an upper surface and a lower surface;

the improvement wherein:

the holes are stress-reduction holes and extend between the surfaces, thereby configuring the primary table member to resist cracking; and the primary table member includes a plurality of vibrator attachment holes, each of which is spaced from the stress-reduction holes.

2. The apparatus of claim 1 wherein:

the plurality of stress-reduction holes includes first and second groups of stress-reduction holes;

each stress-reduction hole in each of the first and second groups has a center axis;

the center axes of the stress-reduction holes in the first group are coincident with a first reference line;

the center axes of the stress-reduction holes in the second group are coincident with a second reference line which is perpendicular to the first reference line.

3. The apparatus of claim 2 wherein each of the first and second groups of stress-reduction holes includes at least four holes.

4. The apparatus of claim 1 wherein:

the upper surface includes a plurality of sockets formed therein;

a separate standoff stud is received in each socket;

an assembly is mounted to the standoff studs and maintained in a spaced relationship from the upper surface by the studs;

each of the studs includes a neck extending above the assembly;

a product mount is supported by the necks in a spaced relationship from the assembly.

5. The apparatus of claim 4 wherein the assembly includes an insulating layer above the upper surface of the primary table member.

6. The apparatus of claim 5 wherein:

the insulating layer includes an upper surface and a lower surface;

the assembly includes a platform against the upper surface of the insulating layer; and the assembly includes a support sheet against the lower surface of the insulating layer.

7. The apparatus of claim 6 wherein the support sheet is coupled to the standoff studs and is in a spaced relationship to the upper surface of the primary table member.

8. The apparatus of claim 1 wherein:

each stress-reduction hole has a wall defining a hole area;

the table member has a perimeter edge defining an area; and the total of the areas of the stress-reduction holes is in the range of 40% to 60% of the area defined by the perimeter edge.

9. The apparatus of claim 8 wherein the total of the areas of the stress-reduction holes is about 50% of the area defined by the perimeter edge.

10. The apparatus of claim 1 in combination with a product under test and wherein:

the apparatus includes a plurality of standoff studs mounted to the table member;

the apparatus includes an insulating assembly spaced from the table member and supported above the table member by the standoff studs; and the product is spaced from and supported above the insulating assembly by the standoff studs.

* * * * *